United States Patent [19]

McCann, III

[11] 4,151,123

[45] Apr. 24, 1979

[54] CATALYTIC PEROVSKITES ON PEROVSKITE SUPPORTS AND PROCESS FOR PREPARING THEM

[75] Inventor: Elrey L. McCann, III, Wilmington, Del.

[73] Assignee: E. I. Du Pont de Nemours & Company, Wilmington, Del.

[21] Appl. No.: 732,747

[22] Filed: Oct. 15, 1976

Related U.S. Application Data

[63] Continuation-in-part of Ser. No. 566,109, Apr. 8, 1975, abandoned.

[51] Int. Cl.² .................. B01J 21/04; B01J 23/10; B01J 23/58; B01J 23/78
[52] U.S. Cl. .................. 252/462; 252/461; 252/467; 252/468; 252/471; 252/472; 252/473; 252/474; 252/475; 252/476; 423/213.2; 423/213.5

[58] Field of Search .............. 252/462, 472, 461, 467, 252/468, 471, 473, 475, 476, 474; 423/213.2, 213.5

[56] References Cited

U.S. PATENT DOCUMENTS

| | | | |
|---|---|---|---|
| 3,259,454 | 7/1966 | Michalko | 423/213.5 |
| 3,699,683 | 10/1972 | Tourtellotte et al. | 423/213.5 |
| 3,897,367 | 7/1975 | Lauder | 252/462 |
| 3,900,428 | 8/1975 | Mai et al. | 252/462 |
| 3,901,828 | 8/1975 | Mai et al. | 252/462 |
| 3,905,918 | 9/1975 | Mai et al. | 252/462 |

*Primary Examiner*—W. J. Shine
*Attorney, Agent, or Firm*—James A. Costello; James H. Ryan

[57] ABSTRACT

Catalytic activity of metal oxides is enhanced through application of the metal oxide to a second metal oxide having a perovskite crystal structure.

17 Claims, No Drawings

CATALYTIC PEROVSKITES ON PEROVSKITE SUPPORTS AND PROCESS FOR PREPARING THEM

RELATED APPLICATION

This application is a continuation-in-part of my copending application Ser. No. 566,109, filed Apr. 8, 1975, and now abandoned.

BACKGROUND OF THE INVENTION

Increased environmental awareness in recent years has correspondingly increased the need for highly efficient catalytic compositions suitable for the reduction of undesirable industrial and automotive atmospheric emissions. In particular, catalysts have been sought which would convert into innocuous gases the undesirable hydrocarbons, nitrogen oxides and carbon monoxide often found in such emissions.

While many highly satisfactory catalysts have been developd for such uses, most have relied heavily on platinum metals which are not only costly but of limited supply. Accordingly, a continuing need exists for the preparation of catalysts which reduce or eliminate the need for platinum metals.

SUMMARY OF THE INVENTION

The present invention provides an improved catalytic structure which increases the efficiency of certain catalytic metal oxides.

Specifically, the present invention provides a catalytic composition comprising a catalytically effective amount of at least one first metal oxide of a transition metal having an atomic number selected from 23 to 30, 42 to 47, and 74 to 79 on a second metal oxide having a perovskite crystal structure.

The invention further provides a process for the prparation of these catalytic compositions comprising applying catalytically effective amount of a first metal oxide of a transition metal having an atomic number selected from 23 to 30, 42 to 47, and 74 to 79 to a second metal oxide having a perovskite crystal structure.

DETAILED DESCRIPTION OF THE INVENTION

The metal oxides having a perovskite crystal structure used as supports in the catalytic compositions of the present invention are oxides of the general empirical formula $ABO_3$ containing substantially equal numbers of metal cations occupying the A sites and the B sites in the perovskite crystalline structure. In the ideal perovskite structure such oxides contain cations of appropriate relative sizes and coordination properties and have cubic crystalline forms in which the corners of the unit cubes are occupied by the larger A site cations, each coordinated with twelve oxygen atoms, the centers of the cubes are occupied by the smaller B site cations, each coordinated with six oxygen atoms, and the faces of the cubes are occupied by oxygen atoms. Variations and distortions of this fundamental cubic crystal structure are known among materials commonly considered to be perovskites or perovskite-like. Distortions of the cubic crystal structure of perovskite and perovskite-like metal oxides include rhombohedral, orthorhombic, pseudocubic, tetragonal, and pseudotetragonal modifications.

The A site metals used in the preparation of such perovskite compositions can be from the periodic table groups 1A, 1B, 2A, 3B, 4A and 5A, lanthanide rare earth metals (atomic numbers 58 through 71) and from the actinide rare earth metals (atomic numbers 90 through 104).

The B site cations can be present in any amount and valence which are consistent with the perovskite crystal structure of the compounds. Accordingly, they can have valences of from 1 to 7 and can be from the periodic table groups 1A, 1B, 2A, 2B, 3A, 3B, 4A, 4B, 5A, 5B, 6B, 7B, and 8 or from the lanthanide and actinide rare earth metals.

The basic function of the perovskite support in the present catalytic compositions is to impart thermal and chemical stability to the structure as a whole. Accordingly, those perovskite compositions are preferred which contain at least one metal known to stabilize the perovskite composition including, for example, Group 3A metals, the lanthanide rare earth and actinide metals. The stability of the perovskite structure can also be increased by the inclusion of a major portion, that is, at least about 50%, of B site metals having a fixed valence. The inclusion of aluminum has been found particularly beneficial in this respect.

Particularly stable compositions which can be used as supports in the instant invention are those having a Lattice Stability Index of less than about 12.3 electron volts, and preferably less than about 12.0. The Lattice Stability Index is the sum of the products of the atomic fractions of each metal cation in a compound and the first ionization potential of the metal. By first ionization potential is meant that given by Vedeneyev et al. "Bond Energies, Ionization Potentials and Electron Affinities", St. Martin's Press (1966).

The term "atomic fraction" is used in its usual sense, indicating the fraction of the type A or type B cation sites occupied by a metal. Thus, for the composition $[Sr_{0.1} La_{0.9}] [Al_{0.9} Ru_{0.1}] O_3$, the atomic fractions of the four metal cations are 0.1, 0.9, 0.9 and 0.1, respectively. In calculating the Lattice Stability Index of the composition, the atomic fraction of each cation is multiiplied by the first ionization potential of the metal from which the cation is formed. The sum of the products so obtained is the Lattice Stability Index.

In addition to having good stability the perovskite support should exhibit a level of catalytic activity as high as practical. Catalytic activity can be imparted by inclusion of more than about 10% of B site metals having a variable valence, particularly if at least about 5% of the B site metal is present in a first valence and at least about 5% of the same metal is present in a second valence. Particularly satisfactory metals for imparting increased catalytic activity are iron, cobalt and nickel. While the catalytic activity of the substrate can be readily increased by the inclusion of a platinum metal selected from ruthenium, osmium, rhodium, iridium, palladium and platinum, it is preferred to use perovskite supports substantially free from platinum metals. The major catalytic activity of the present compositions is believed to result from the catalytically active metal oxide on the surface of the compositions rather than the perovskite substrate. Moreover, one of the principal benefits of the present invention is believed to be enhanced catalytic activity of the surface metal oxide, permitting the use of lesser amounts of rare platinum metals without a depreciation of catalytic effect.

The perovskite supports can be prepared by heating mixtures of metal oxides, hydroxides, metals and/or metal salts for sufficient times at temperatures which permit spontaneous formation of the compounds. The mixtue of materials which are heated are preferably finely subdivided and intimately mixed before heating and are thoroughly ground and mixed by any conventional techniques several times during the heating period, since the compounds are in many instances formed by atomic diffusion, without melting of any of the starting or potential intermediate materials, and are subject to coating of unreacted particles by reaction products. The heating times and temperatures required for the formation of significant amounts of these compounds depend upon the particular compositions being formed, the required times usually being shorter at higher temperatures. Temperatues above about 800° C. are usually suitable for the formation of these compounds but temperatures above about 900° C. are usually preferred with firing times of hours to days with occasional intermediate grinding and mixing, and temperatures of 1,000° to 1,500° C. can be used.

In forming the compounds used in this invention, stoichiometric mixtures of starting materials are preferably heated in air or other oxygen-containing gas mixtures.

The catalytically active metal oxides coated onto the perovskite supports comprise at least one transition metal having known catalytic activity. These include those metals having atomic numbers from 23 to 30, 42 to 47, and 74 to 79. Within this class of metals are some which exhibit particularly satisfactory performance in the oxidation of carbon-containing compounds and the reduction of nitrogen oxides. These include those transition metals having an atomic number of 23 to 30, that is, vanadium, chromium, manganese, iron, cobalt, nickel, copper, and zinc, as well as the platinum group metals rhodium, ruthenium, palladium, osmium, iridium, and platinum. Accordingly, these particular transition metals are preferred. Metal oxides having about from 1% to 20% by weight of a platinum group metal have been found to exhibit particularly high catalytic activity.

The catalytically active metal oxide coated onto the perovskite supports preferably contains other components which are known to stabilize catalytically active oxides. These can include, for example, lanthanide rare earth, and actinide metals. Other components of the catalytically active metal oxide composition can include those metals which, together with the catalytically active metal, are capable of forming a perovskite composition. Those metals found particularly convenient for imparting stability or catalytic activity include strontium, lanthanum, aluminum, platinum, and ruthenium. In general, to provide excellent catalytic stability, it is preferred that the catalytically active metal oxide exhibit a Lattice Stability Index of less than about 12.3. The stability of the present compositions is further enhanced when the perovskite support and the catalytically active metal oxide contain at least one common metal ion.

The catalytically active metal oxides can be applied to the perovskite substrate by any convenient means. The quantity of catalytic metal present in the compositions of the invention can be from 10 parts per million to 30% by weight of the combined metal oxide coating and its perovskite support. Less than 10 ppm of catalytic metal, usually concentrated in the coating, does not provide significant catalytic effect. In general, when the catalytic transition metal is a platinum metal, between 100 ppm and 5% is preferred. When the catalytic metal is a non-platinum metal, 0.1% to 10.0% can be used to advantage.

When the components of the catalytic metal oxide are present in proportions consistent with the formula $ABO_3$, and the catalytic metal is a platinum metal, the platinum metal is preferably present in amounts of about from 1% to 20% by weight of the type B site cations.

The components of the metal oxides should preferably be applied to the perovskite substrate in proportions such that the makeup of the catalytic metal oxide is consistent with the formula $ABO_3$. It is also preferred that the first and second metal oxides contain at least one common metal.

One convenient method for the application of metal oxide to the perovskite substrate is immersion of the substrate into a solution of metal oxide precursors such as nitrates, sulfates, and chlorides. The metal ion concentration of the solution can be adjusted to provide the desired degree of metal ion deposition. Aqueous, inorganic or organic solutions can be used, as will be readily apparent to those skilled in the art. After removal of the solvent, the conversion of the metal oxide precursors can be carried out, for example, by thermal decomposition. Alternatively, a solution or suspension of metal oxide precursors can be sprayed onto to the substrate in lieu of immersion.

Preformed metal oxides can also be applied directly to the perovskite substrates. If the metal oxides and other ingredients are not readily suspended in the liquid, conventional dispersants can be used.

Still other means for applying the metal oxides or oxide precursors to the perovskite substrates include vapor deposition or mechanical mixing of the perovskite substrates and metal oxides or oxide precursors.

After application of a metal oxide precursor to the perovskite substrate, it can be converted to the metal oxide most conveniently by heating. While the exact times and temperatures required for such conversion will necessarily vary with the particular compound involved, in general heating an oxide precursor at a temperature and time sufficient to convert the precursors to an oxide. Generally, a temperature of at least about 800° C. for a period of at least one hour is sufficient to convert part of the precursor to the catalytically active metal oxide. Heating temperatures of from 900° C. to 1200° C. will generally provide faster conversions with no adverse effects, and heating periods of up to several days will increase the completeness of the conversion.

The coated perovskite compositions of the invention can be used as catalysts in the form of free-flowing powders, for example, in fluid-bed reaction systems, or in the form of shaped structures providing efficient contact between the catalyst and reactant gases. The catalyst compositions can contain minor or major amounts of catalytically inert materials, with the catalytic compositions primarily on the surfaces of the inert material or dispersed throughout. For example, the powdered compounds can be formed into porous catalyst pellets in which thye are dispersed throughout by conventional techniques employing pellet presses, rolling mixers or extruders. Dispersants, lubricants, and binders are often used in conjunction with the preparation of such pellets.

One particularly useful dispersant-binder for use in forming extruded pellet catalyst structures containing the catalyst compositions described herein is a high-purity alpha alumina monohydrate sold by the Continental Oil Co. as "Dispal". This material is a white, free-flowing powder of small particle size formed of very fine ultimate crystallites having a surface area of about 200 square meters per gram and a bulk density of 45 to 50 pounds per cubic foot. It forms thixotropic dispersions at concentrations of about 3% to 30% in water containing about 4% to 6% commercial concentrated (37% HCl) hydrochloric acid based on the weight of alumina, which dispersions become thicker upon standing. Thick dispersions containing about 20 to 30 parts of the alumina mononhydrate and about 100 to 150 parts of acidified water per 100 parts of a catalytic composition having a surface area of about two square meters per gram can be extruded through small orifices to obtain structures which retain their form when wet and have significant strength when dried of gross water and heated at about 500° C. to about 900° C. to remove at least a part of the water present in the alumina monohydrate.

The catalytic compositions of this invention are preferably used in the form of coatings on suitable refractory supports. Such supports can be composed solely or primarily of silica, of ceramic compositions having softening or melting temperatures above the temperatures involved in forming or coating these catalytic compositions on such supports, of natural silicious materials such as diatomaceous earths and pumice, as well as alundum, gamma alumina, silicon carbode, titania, zirconia, and other such refractory materials.

The compositions of the present invention can be applied to supports either before or after the completion of the catalytic compositions. For example, the perovskite substrates of the present catalytic compositions can be formed on supports which are sufficiently high melting and non-reactive to withstand the subsequent processing steps involved in the application of the catalytic metal oxide compositions to the perovskite substrate. Alternatively, the catalytic composition of the invention can be performed and applied to the support structure in a slurry. A particularly useful dispersant-binder for use in such slurry-coating processes in the "Dispal" alpha alumina monohydrate described above as a dispersant-binder useful in making extruded catalyst structures. Typically, acidified dispersions containing about 4% to 10% alpha alumina hydrate and a comparable amount of the ground catalytic compositions are prepared, pieces of the support material are coated with the dispersion, the coated pieces are dried, and the dried coated pieces are heated to a temperature and for a time (e.g., for 2 to 24 hours at 500° C. to 900° C.) to remove at least a portion of the water from the alpha alumina monohydrate.

While the catalytic compositions of the present invention are useful in a wide variety of oxidation and reduction reactions, they are particularly effective in the catalyzation of oxidation of hydrocarbons and carbon monoxides and also the reaction between nitrogen oxides and carbon monoxides to give nitrogen and carbon dioxide. The combination of the catalytically active metal oxide coated onto a perovskite support results in a catalyst having exceptional stability under a variety of adverse reaction conditions. Accordingly, the catalytic activity of these compositions is sustained over a significantly longer period of time than would normally be expected. Moreover, the catalytic activity realized from these compositions is found to be significantly higher than what would be expected from the known catalytic characteristics of the metal oxide compositions, even taken together with any catalytic contribution by the perovskite support. This permits the use of significantly smaller amounts of noble metals such as the platinum metals in a catalytic system for a comparable catalytic effect. More significantly, it permits the use of simple, nonplatinum, metal oxides alone as catalysts in applications where the catalytic activity of these simple metal oxides has heretofor not been considered adequate.

The invention is further illustrated by the following specific examples.

EXAMPLE 1

A metal oxide composition having the nominal formula $[Sr_{0.2}La_{0.8}][Co]O_3$ was formed on the surface of the perovskite calcium titanate of the general formula $CaTiO_3$. The calcium titanate, commercially obtained from Alfa Inorganics - Ventron, was passed through a 325-mesh Tyler standard sieve screen and then immersed in a solution as described in Table 1. The impregnated $CaTiO_3$ was separated from the solution, dried, and heated at 700° C. for one hour and then at 1000° C. overnight. The impregnated and heated powder was black.

The resulting catalytic composition was applied to a support for catalytic performance characteristic determinations. One part of "Dispal" M alumina dispersant and binder, having a surface area of about 164 square meters per gram as determined with nitrogen by the Brunauer-Emmett-Teller method, was mixed with 17 parts of water containing a few drops of concentrated hydrochloric acid. To this mixture was added 7.5 parts of the catalytic composition to obtain a stable thixotropic slurry. A cylinder of "Torvex" alumina ceramic honeycomb with straight-through cells (commercially avaialble from E. I. du Pont de Nemours & Company) was soaked in water. This cylinder weighed about 7 grams was about 2.5 centimeters in diameter and thickness and had a nominal cell size of 1/16 inch, wall thickness of 0.018 inch, open area of 50%, 253 hexagonal holes per square inch, and a nominal geometric surface area of 462 square feet per cubic foot. The water-soaked cylinder was dipped into the slurry of the catalytic composition, the gross excess of slurry was removed by blowing the cylinder with air, the cylinder was dried, and the cylinder coated with the catalytic composition and binder was heated for about 30 minutes in air in a muffle furnace at 700° C. The cylinder was again soaked in water, dipped into the slurry, blown free of excess slurry, and dried and then was heated in air at 700° C. for two hours. The percentage increase in weight of the cylinder due to the adherent catalytic composition and binder was about 20%.

The catalytic activity of this composition in the reduction of nitric oxide by carbon monoxide was determined. The "Torvex" ceramic honeycomb cylinder coated with the catalytic composition and binder was installed in a stainless steel chamber with a nominal internal diameter of 2.5 centimeters, height of 2.5 centimeters, and volume of 12.3 cubic centimeters. Nitrogen containing about 2000 parts per million of nitric oxide and about 10,000 parts per million of carbon monoxide was passed through the chamber at a nominal hourly space velocity of about 40,000 hr. $^{-1}$ and pressure of one pound per square inch gage while the feed gas and the catalyst chamber were heated so that the temperature of the gas entering the catalyst chamber increased from about 60° C. to about 600° C. over about 90 minutes. Samples of the inlet and exit gases were obtained periodically. The nitric oxide in these samples was oxidized to nitrogen dioxide. The resulting gas mixture was analyzed and the percent reduction in the nitric oxide concentration of the gas upon passing through the catalyst chamber was calculated. A smooth plot was made of the degree of conversion of nitric oxide at different catalyst chamber inlet temperatures for each catalytic composition. From a smooth curve through each plot, temperatures were estimated for "light-off" (the intercept with the temperature axis of an extrapolation of the portion of the curve at which the degree of conversion changed rapidly with temperature) and for nitric oxide conversions of 25%, 50%, and 90%. The catalyst temperature was higher than the catalyst bed inlet temperature with all the catalytic compositions at nitric oxide conversions greater than about 25%. Table II gives the estimated temperatures for "light-off" and for 25%, 50%, and 90% conversion of nitric oxide before and after heating the catalyst-coated honeycomb cylinders for 100 hours at about 900° C.

The catalytic activity of the "Torvex" cylinder coated with the catalytic composition and binder in the oxidation of carbon monoxide was determined in a similar apparatus and by a similar procedure. Nitrogen containing about 10,000 parts per million of carbon monoxide and 10,000 parts per million of oxygen was passed through the catalyst chamber and the entering and exiting gas mixtures were analyzed chromatographically using a column containing granules of "Linde" 13X molecular sieve. The estimated temperatures for "light-off" and for 25%, 50%, and 90% conversion of carbon monoxide before and after heating the catalyst-coated honeycomb cylinders for 100 hours at about 900° C. are given in Table II.

The catalytic activity of the "Torvex" cylinder coated with the catalytic composition in the oxidation of propane was determined in a similar apparatus and by a similar procedure. Nitrogen containing about 1300 parts per million of propane was determined in a similar apparatus and by a similar procedure. Nitrogen containing about 1300 parts per million of propane and 8800 parts per million of oxygen was passed through the catalyst chamber and the entering and exiting gases were analyzed chromatographically using a column containing 80-100 mesh "Poropak" Q. The temperatures for "light-off" and for 25%, 50% and 90% conversion of propane before and after heating the catalyst-coated honeycomb cylinders for 100 hours at about 900° C. are given in Table II.

EXAMPLE 2

A perovskite composition having the nominal formula $[Sr_{0.4}La_{0.6}][Co_{0.8}V_{0.2}]O_3$ was prepared. To a solution of 72.4 grams of strontium nitrate $[Sr(NO_3)_2]$, 200 grams of lanthanum nitrate $[La(NO_3)_3.6H_2O]$, and 179.2 grams of cobalt nitrate $[Co(NO_3)_2.6H_2O]$ in 3 liters of water was slowly added a solution of 268 grams of potassium carbonate $(K_2CO_3)$ in 1.5 liters of water. To the resulting slurry was added 12.8 grams of vanadium oxide $(V_2O_4)$ with stirring. The slurry was filtered and the separated solids were washed with water and dried under reduced pressure at 120° C. The dried solids were ground, mixed, and heated in air at 950° C. overnight. The resulting composition was ground and passed through a 325-mesh Tyler standard sieve screen. It had a surface area of 2.3 square meters per gram, determined with nitrogen by the BET method.

A catalytic composition having the nominal formula $]Sr_{0.4}La_{0.6}][Co_{0.9}Pt_{0.1}]O_3$ was formed on the surface of this perovskite composition. Twenty-five grams of the perovskite composition was soaked for about 30 minutes at room temperature in a salt solution having the composition given in Table I. The impregnated material was separated from the salt solution, dried, and heated at 950° C. overnight. It was shown by X-ray fluorescence analysis to contain more than 5% strontium and lanthanum, between 0.2% and 5% cobalt and vanadium, less than 0.2% platinum, and several other elements in trace amounts.

The above catalytic composition was applied to a "Torvex" alumina ceramic honeycomb cylinder as described in Example 1. The percentage increase in weight of the support was 27.6%. X-Ray fluorescence analysis, using a double dilution technique, showed it to contain 0.07% platinum and wet chemical analytical methods showed it to contain 0.036% platinum.

The activity of the supported catalytic composition was determined as described in Example 1, before and after heating in air at 950° C. for 100 hours, to obtain the data given in Table II.

EXAMPLES 3 AND 4

Cylinders of "Torvex" alumina ceramic honeycomb weighing about 7.2 grams were coated with a mixture of the perovskite $CaTiO_3$ and "Dispal" M alumina dispersant and binder as described in Example 1. The increase in the weight of the dry cylinder was 21.4% in Example 3 and 15.7% in Example 4.

Metal oxide catalytic compositions having the nominal formulas

Example 3: $[Sr_{0.2}La_{0.8}][Co]O_3$
Example 4: $[Sr_{0.2}La_{0.8}][Co_{0.9}Ru_{0.1}]O_3$ were formed on these coated cylinders. The coated cylinders were immersed in the salt solutions described in Table 1, dried, heated at 1000° C. for about 30 minutes. The cylinder for Example 4 was then heated in air at 1000° C. for about 16 hours. The cylinder for Example 3 was again immersed in the salt solution, and dried, and then heated in air at 1000° C. for about 64 hours.

The activity of the resulting catalytic compositions was determined as described in Example 1 to obtain the data given in Table II.

EXAMPLE 5

A cylinder of "Torvex" alumina ceramic honeycomb like that of Example 1 was coated with a composition containing the perovskite lanthanum aluminate. One part of "Dispal" M alumina dispersant and binder was mixed with 17 parts of water containing a few drops of commercial concentrated hydrochloric acid. To this mixture was added 7.5 parts of lanthanum oxide $(La_2O_3)$ to obtain a stable thixotropic slurry. The water-soaked cylinder was dipped twice into the slurry as described in Example 1, dried, and heated at 1000° C. overnight. The increase in weight of the cylinder was 12.1%.

A metal oxide catalytic composition having the nominal formula $[SR_{0.2}La_{0.8}][Co_{0.9}Ru_{0.1}]O_3$ was formed on the surface of the coated cylinder as described in Example 4.

The activity of the resulting catalytic composition was determined as described in Example 1 to obtain the data given in Table II.

EXAMPLE 6

The perovskite lanthanum aluminate was prepared. To a solution of 200 grams of lanthanum nitrate [La(NO$_3$)$_3$.9H$_2$O] and 173.25 grams of aluminum nitrate [Al(NO$_3$)$_3$.9H$_2$O] in 3 liters of water was slowly added a solution of 153.7 grams of potassium carbonate (K$_2$CO$_3$) in one liter of water. The resulting slurry was filtered and the separated solids were washed with water until neutral and dried under reduced pressure at 120° C. The dried solids were ground, mixed, and heated at 950° C. for about one hour and then four times ground, mixed, and heated at 950° C. overnight. The resulting composition was ground and passed through a 325-mesh Tyler standard sieve screen. The product had a surface area of 11.5 square meters per gram, measured with nitrogen by the BET method. X-Ray diffraction analysis showed it to contain the perovskite LaAlO$_3$ along with La$_2$O$_3$.

A cylinder of "Torvex" alumina ceramic honeycomb was coated with this perovskite composition by the procedures of Example 1. The percentage increase in the weight of the cylinder was 15.5%.

A metal oxide catalytic composition having the nominal formula [Sr$_{0.4}$La$_{0.6}$] [Co$_{0.9}$Pt$_{0.1}$]O$_3$ was formed on the surface of the coated cylinder. The cylinder was soaked for about 30 minutes at room temperature in the salt solution described in Table I, dried, and heated at 950° C. overnight.

The activity of the catalytic composition was determined as described in Example 1, before and after heating in air at 950° C. for 100 hours, to obtain the data in Table II.

EXAMPLE 7

A cylinder of "Torvex" alumina ceramic honeycomb was coated by the procedures of Example 1 with the perovskite composition [Sr$_{0.4}$La$_{0.6}$] [Co$_{0.8}$V$_{0.2}$]O$_3$ prepared by the procedures described in Example 2. There was obtained in this preparation about 148.5 grams of the composition, which was shown by X-Ray diffraction analysis to contain major amounts of a perovskite having a crystal structure like that of LaCoO$_3$ and a minor amount (10% - 25%) of another composition having a crystal structure similar to that of Sr$_3$V$_2$O$_8$. The percentage increase in the weight of the cylinder was 18.2%.

A metal oxide catalytic composition having the nominal formula [Sr$_{0.4}$La$_{0.6}$] [Co$_{0.9}$Pt$_{0.1}$]O$_3$ was formed on the surface of the coated cylinder. The cylinder was soaked for about 30 minutes at room temperature in the salt solution described in Table I, dried, and heated at 950° C. overnight. The impregnated coated cylinder contained 0.113% platinum by wet chemical analysis.

The activity of the catalytic composition was determined as described in Example 1, before and after heating in air at 950° C. for 100 hours, to obtain the data given in Table II.

EXAMPLES 8 and 9

Cylinders of "Torvex" alumina ceramic honeycomb weighing about 6.7 and 7.4 grams were coated with the perovskite composition [Sr$_{0.4}$La$_{0.6}$] [Co$_{0.8}$V$_{0.2}$]O$_3$ of Example 2 by substantially the procedures of Example 1. The percentage increases in the weights of the cylinders were 17.0% in Example 8 and 14.9 in Example 9.

Metal oxide catalytic compositions having the nominal formulas

Example 8: [Sr$_{0.4}$La$_{0.6}$] [Co$_{0.9}$Rh$_{0.1}$]O$_3$
Example 9: [Sr$_{0.4}$La$_{0.6}$] [Co$_{0.9}$Ru$_{0.1}$]O$_3$
were formed on these cylinders by soaking them in the salt solutions described in Table I, drying, and heating in air at 950° C. overnight.

The activity of the resulting catalytic composition was determined as described in Example 1, before and after heating in air at 950° C. for 100 hours, to obtain the data given in Table II.

EXAMPLE 10

A perovskite having the nominal formula [Ba$_{0.4}$La$_{0.6}$] [Co$_{0.8}$V$_{0.2}$]O$_3$ was prepared. To a solution of 100 grams of lanthanum nitrate [La(NO$_3$)$_3$.6H$_2$O], 42.3 grams of barium nitrate [Ba(NO$_3$)$_2$], and 89.6 grams of cobalt nitrate [Co(NO$_3$)$_2$.6H$_2$O] in 1.5 liters of water was slowly added a solution of 134.1 grams of potassium carbonate (K$_2$CO$_3$) in 0.5 liter of water. To the resulting slurry was added 6.39 grams of vanadium oxide (V$_2$O$_4$) with stirring. The slurry was filtered and the separated solids were washed with water and dried under reduced pressure at 120° C. The dried solids were ground, mixed, and heated at 950° C. for about 60 minutes and then three times ground, mixed, and heated at 950° C. overnight. The resulting composition was ground and passed through a 325-mesh Tyler standard sieve screen. The product had a surface area of less than 1.5 square meters per gram, determined with nitrogen by the BET method. X-Ray diffraction analysis indicated the presence of a major amount of a perovskite having a crystal structure like that a LaCoO$_3$ and the absence of significant amounts of binary metal oxides.

A cylinder of "Torvex" alumina ceramic honeycomb was coated with the above perovskite composition by substantially the procedures of Example 1. The percentage increase in the weight of the cylinder was 22.8%.

A metal oxide composition having the nominal formula [Sr$_{0.4}$La$_{0.6}$] [Co$_{0.9}$Pt$_{0.1}$]O$_3$ was formed on the surface of the coated cylinder. The cylinder was soaked in the salt solution described in Table I for about 30 minutes at room temperature, dried, and heated at 950° C. overnight. The platinum content of the impregnated coated cylinder was determined to be 0.09% by X-Ray fluorescence analysis using a double-dilution technique. It was estimated to be 0.08% from the amount of the salt solution absorbed during impregnation and 0.05% from the change in the weight of the coated cylinder from impregnating with the salt solution, drying, and heating.

The activity of the catalytic composition was determined as described in Example 1 to obtain the data given in Table II.

EXAMPLES 11 TO 20

The perovskite lanthanum aluminate was prepared substantially as described in Example 6. X-Ray diffraction analysis showed the resulting LaAlO$_3$ to contain a major amount of lanthanum oxide. It had a surface area of 20.363 square meters per gram, measured with nitrogen by the BET method.

Cylinders of "Torvex" alumina ceramic honeycomb were coated with this perovskite composition by the procedures of Example 1. The percentage increases in the weights of the cylinders are given in Table III.

Catalytic compositions containing oxides of the following metals:
Example 11: Vanadium
Example 12: Chromium Example 13: Iron
Example 14: Cobalt
Example 15: Nickel
Example 16: Copper
Example 17: Zinc
Example 18: Chromium and Copper
Example 19: Platinum
Example 20: Manganese were formed on the coated cylinders. The cylinders were immersed in the salt solutions described in Table III for about one hour at room temperature, dried, and heated in air for about 16 hours at 950° C. The metal contents of the impregnated coated cylinders, estimated from the increase in dry weight of the coated cylinders, are given in Table III.

The activity of the resulting catalytic compositions were determined as described in Example 1, before and after heating in air at 950° C. for 100 hours, to obtain the data given in Table II.

EXAMPLES 21 to 29

A perovskite composition having the nominal formula $[Sr_{0.4}La_{0.6}]$ $[Co_{0.8}V_{0.2}]O_3$ was prepared substantially by the procedures of Example 2.

Cylinders of "Torvex" alumina ceramic honeycomb were coated with this composition by substantially the procedures of Example 1. The percentage increases in the weights of the cylinders are given in Table III.

Catalytic compositions containing oxides of the following metals:
Example 21: Vanadium
Example 22: Chromium
Example 23: Iron
Example 24: Cobalt
Example 25: Nickel
Example 26: Copper
Example 27: Zinc
Example 28: Copper and Chromium
Example 29: Manganese were formed on the coated cylinders. The cylinders were immersed at room temperature for about one hour in the salt solutions described in Table III, dried, and heated at 950° C. in air for about 16 hours. The metal contents of the impregnated cylinders, estimated from the increase in dry weight of the coated cylinders, are given on Table III.

The activities of these catalytic compositions were determined as described in Example 1, before and after heating in air at 950° C. for 100 hours, to obtain the data given in Table II.

EXAMPLE 30

A coating of the perovskite lanthanum aluminate was formed on the surfaces of alumina pellets. About 80 milliliters of alumina spheres (obtained from the Universal Oil Products Company, about 0.125 inches in diameter) was soaked in a solution of 10 parts of ammonium carbonate and 90 parts of water. The surfaces of the spheres were dried and the spheres were immersed in a solution of 20 parts of lanthanum nitrate $[La(NO_3)_3.6H_2O]$ in 80 parts of water. The impregnated alumina pellets were separated from the solution, dried, and heated at 950° C. overnight in air to form lanthanum aluminate.

A metal oxide having the nominal formula $[Sr_{0.2}La_{0.8}]$ $[Al_{0.9}Ru_{0.1}]O_3$ was formed on the surfaces of the coated pellets. The pellets were immersed in the solution, dried, and heated in air at 950° C. overnight. The pellets were then immersed in a solution of 10 parts of ammonium carbonate in 100 parts of water. The surfaces of the pellets were dried and the pellets were again soaked in the salt solution described in Table I, dried, and heated in air at 900° C. for 100 hours.

The activity of the resulting catalytic composition in the reduction of nitric oxide by carbon monoxide was determined by the procedures of Example 1 with a catalyst chamber 1.5 centimeters in diameter and 3.0 centimeters long substantially filled with about 2.6 grams of the impregnated coated pellets. The nominal hourly space velocity was about 53,000 hr.$^{-1}$. The data obtained are given in Table II.

EXAMPLE 31

A coating containing perovskite aluminates of lanthanum and other rare earth metals were formed on the surface of alumina pellets. About 25 milliliters (weighing about 12 grams) of the alumina pellets described in Example 31 was soaked in a solution of 10 parts of mixed rare earth nitrates (obtained from Lindsay Kerr McGee, containing rare earth metals in the following appromixmate ratios (expressed as oxides): La, 24%; Ce, 48%; Pr, 5%; Nd, 17%; Sm, 3%; Gd, 2%; other, 1%) in 50 parts of water. The pellets were dried and heated at 1000° C. for about 30 minutes, soaked again in the solution of rare earth nitrates, dried, and heated at 1000° C. in air overnight.

A catalytic metal oxide having the nominal formula $[Sr_{0.2}La_{0.8}]$ $[Co_{0.9}Ru_{0.1}]O_3$ was formed on the surfaces of the coated pellets. The pellets were immersed in the salt solution described in Table I, dried, and heated in air at 1000° C. for about 30 minutes. The pellets were again immersed in the salt solution, dried, and then heated in air at 1000° C. overnight. They were estimated to contain 0.02% ruthenium from the increase in weight upon immersion in the salt solution described in Table I.

The catalytic activity of the resulting composition was determined by the procedures of Example 30 to obtain the data given in Table II.

TABLE I

| | Solution Compositions | | | | | |
| | Grams per 100 Milliliters of Water | | | | | |
| Example: | 1,3 | 2,6,7,10 | 4,5,31 | 8 | 9 | 30 |
|---|---|---|---|---|---|---|
| Strontium nitrate, $Sr(NO_3)_2$ | 1.22 | 1.74 | 0.61 | 1.74 | 1.74 | 0.122 |
| Lanthanum nitrate, $La(NO_3)_3 . 6H_2O$ | 10.0 | 5.36 | 4.79 | 5.36 | 5.36 | 1.00 |
| Aluminum nitrate, $Al(NO_3)_3 . 9H_2O$ | — | — | — | — | — | 0.866 |
| Cobalt nitrate, $Co(NO_3)_2 . 6H_2O$ | 8.4 | 5.38 | 3.78 | 5.38 | 5.38 | — |
| Rhodium chloride, $RhCl_3 . xH_2O$ (42.07% Rh) | — | — | — | 0.502 | — | — |
| Ruthenium chloride, $RuCl_3 . xH_2O$ (39.71% Ru) | — | — | 0.37 | — | 0.522 | 0.074 |
| Potassium chloroplatinate, $K_2PtCl_6 . xH_2O$ (40% Pt) | — | 1.0 | — | — | — | — |

TABLE II

Catalytic Activity

Examples 1–9

| Example | 1 | | 2 | | 3 | | 4 | | 5 | | 6 | | 7 | | 8 | | 9 | |
|---|---|---|---|---|---|---|---|---|---|---|---|---|---|---|---|---|---|---|
| Hours at 900° C. | 0 | 100 | 0 | 100 | 0 | 100 | 0 | 100 | 0 | 100 | 0 | 100 | 0 | 100 | 0 | 100 | 0 | 100 |
| Reduction of Nitric Oxide | | | | | | | | | | | | | | | | | | |
| "Light-off" temp., °C. | 385 | 445 | 295 | 240 | 360 | 290 | 335 | — | 320 | — | 265 | 260 | 290 | 360 | 280 | — | 275 | — |
| 25% conversion, °C. | 430 | 485 | 330 | 305 | 505 | 425 | 415 | — | 405 | — | 305 | 305 | 360 | 410 | 320 | — | 315 | — |
| 50% conversion, °C. | 480 | 540 | 370 | 375 | 590 | 470 | 480 | — | 445 | — | 345 | 350 | 425 | 460 | 360 | — | 350 | — |
| 90% conversion, °C. | 585 | 590 | 430 | 475 | — | 575 | 590 | — | 540 | — | 430 | 530 | 495 | 540 | 420 | — | 455 | — |
| Oxidation of Carbon Monoxide | | | | | | | | | | | | | | | | | | |
| "Light-off" temp., °C. | 290 | 285 | 165 | 170 | 245 | 240 | 260 | — | 250 | — | 200 | 180 | 185 | 180 | 170 | — | 185 | — |
| 25% conversion, °C. | 410 | 420 | 205 | 180 | 255 | 340 | 305 | — | 295 | — | 215 | 195 | 205 | 200 | 185 | — | 200 | — |
| 50% conversion, °C. | 535 | — | 250 | 185 | 289 | 400 | 385 | — | 335 | — | 230 | 205 | 225 | 225 | 200 | — | 220 | — |
| 90% conversion, °C. | — | — | 325 | 200 | 460 | — | — | — | 390 | — | 255 | 225 | 255 | 265 | 225 | — | 240 | — |
| Oxidation of Propane | | | | | | | | | | | | | | | | | | |
| "Light-off" temp., °C. | 380 | 525 | 235 | — | 295 | 275 | — | — | 365 | — | 245 | 230 | 360 | 345 | 300 | — | 260 | — |
| 25% conversion, °C. | — | — | 315 | — | 560 | — | — | — | 510 | — | 265 | 270 | 440 | 505 | 425 | — | 390 | — |
| 50% conversion, °C. | — | — | 380 | — | — | — | — | — | 575 | — | 285 | 305 | 535 | 515 | 510 | — | 490 | — |
| 90% conversion, °C. | — | — | — | — | — | — | — | — | — | — | 415 | 460 | — | — | — | — | — | — |

Examples 10–17

| Example | 10 | | 11 | | 12 | | 13 | | 14 | | 15 | | 16 | | 17 | |
|---|---|---|---|---|---|---|---|---|---|---|---|---|---|---|---|---|
| Hours at 900° C. | 0 | 100 | 0 | 100 | 0 | 100 | 0 | 100 | 0 | 100 | 0 | 100 | 0 | 100 | 0 | 100 |
| Reduction of Nitric Oxide | | | | | | | | | | | | | | | | |
| "Light-off" temp., °C. | 147 | — | 455 | 450 | 290 | 250 | 270 | — | 350 | — | 275 | 365 | 295 | 385 | 460 | 400 |
| 25% conversion, °C. | 320 | — | 590 | 530 | 320 | 425 | 320 | — | 450 | — | 350 | 465 | 395 | 445 | 600 | 525 |
| 50% conversion, °C. | 365 | — | — | — | 350 | 510 | 370 | — | 525 | — | 420 | 535 | 440 | 510 | — | 585 |
| 90% conversion, °C. | 415 | — | — | — | 395 | 590 | 450 | — | 590 | — | 490 | — | 515 | 585 | — | — |
| Oxidation of Carbon Monoxide | | | | | | | | | | | | | | | | |
| "Light-off" temp., °C. | 220 | 320 | 320 | 325 | 240 | 245 | 220 | — | 210 | — | 230 | 255 | 155 | 155 | 280 | 330 |
| 25% conversion, °C. | 235 | 420 | 420 | 400 | 335 | 275 | 250 | — | 230 | — | 250 | 285 | 165 | 165 | 420 | 375 |
| 50% conversion, °C. | 245 | 455 | 455 | 465 | 375 | 305 | 275 | — | 250 | — | 270 | 315 | 175 | 175 | 490 | 420 |
| 90% conversion, °C. | 270 | 525 | 525 | — | — | 350 | 320 | — | 285 | — | 300 | 360 | 190 | 195 | — | 565 |
| Oxidation of Propane | | | | | | | | | | | | | | | | |
| "Light-off" temp., °C. | 330 | — | 550 | 445 | 295 | 425 | 430 | — | 370 | — | 300 | 385 | 340 | 340 | 380 | 320 |
| 25% conversion, °C. | 440 | — | — | 590 | 410 | 560 | 545 | — | 455 | — | 385 | 520 | 430 | 485 | 565 | 550 |
| 50% conversion, °C. | 550 | — | — | — | 460 | — | 600 | — | 520 | — | 430 | 585 | 480 | 570 | — | — |
| 90% conversion, °C. | — | — | — | — | 585 | — | — | — | — | — | 575 | — | — | — | — | — |

Examples 18–26

| Example | 18 | | 19 | | 20 | | 21 | | 22 | | 23 | | 24 | | 25 | | 26 | |
|---|---|---|---|---|---|---|---|---|---|---|---|---|---|---|---|---|---|---|
| Hours at 900° C. | 0 | 100 | 0 | 100 | 0 | 100 | 0 | 100 | 0 | 100 | 0 | 100 | 0 | 100 | 0 | 100 | 0 | 100 |
| Reduction of Nitric Oxide | | | | | | | | | | | | | | | | | | |
| "Light-off" temp., °C. | 245 | 290 | 380 | 375 | 240 | 250 | 260 | 260 | 275 | 300 | 250 | 370 | 280 | 205 | 290 | 360 | 305 | 280 |
| 25% conversion, °C. | 285 | 380 | 425 | 480 | 330 | 425 | 435 | 385 | 315 | 440 | 310 | 475 | 425 | 345 | 335 | 440 | 350 | 330 |
| 50% conversion, °C. | 325 | 450 | 470 | 530 | 415 | 510 | 450 | 355 | 525 | 370 | 530 | 480 | 435 | 380 | 515 | 390 | 380 | — |
| 90% conversion, °C. | 385 | 570 | 575 | 590 | 485 | 590 | 585 | 535 | 450 | 585 | 465 | 590 | 565 | 500 | 455 | 585 | 460 | 470 |
| Oxidation of Carbon Monoxide | | | | | | | | | | | | | | | | | | |
| "Light-off" temp., °C. | 155 | 170 | 250 | 185 | 225 | 245 | 195 | 180 | 175 | 210 | 170 | 220 | 170 | 155 | 165 | 240 | 195 | 175 |
| 25% conversion, °C. | 160 | 190 | 265 | 235 | 245 | 275 | 230 | 205 | 185 | 240 | 180 | 240 | 185 | 170 | 180 | 275 | 210 | 190 |
| 50% conversion, °C. | 170 | 210 | 285 | 255 | 265 | 305 | 260 | 230 | 195 | 265 | 195 | 260 | 200 | 185 | 195 | 305 | 225 | 205 |
| 90% conversion, °C. | 185 | 245 | 310 | 285 | 295 | 350 | 310 | 270 | 210 | 305 | 215 | 290 | 225 | 205 | 215 | 355 | 250 | 230 |
| Oxidation of Propane | | | | | | | | | | | | | | | | | | |
| "Light-off" temp., °C. | 290 | 360 | 265 | 250 | 235 | 350 | 285 | 300 | 360 | 270 | 295 | 340 | 300 | 270 | 225 | 335 | 345 | 280 |

TABLE II-continued

| | | | | | | | | | | | | | | | | | |
|---|---|---|---|---|---|---|---|---|---|---|---|---|---|---|---|---|---|
| 25% conversion, °C | 370 | 555 | 385 | 345 | 415 | 380 | 430 | 420 | 405 | 375 | 565 | 420 | 330 | 325 | 510 | 445 | 370 |
| 50% conversion, °C | 415 | — | 525 | 375 | 475 | 490 | — | 495 | 535 | 455 | — | 495 | 385 | 375 | 595 | 515 | 430 |
| 90% conversion, °C | 545 | 555 | — | 525 | — | — | — | — | — | — | — | — | 600 | 555 | — | — | — |

Catalytic Activity

| Example | 27 | | 28 | | 29 | | 30 | | 31 | |
|---|---|---|---|---|---|---|---|---|---|---|
| Hours at 900° C. | 0 | 100 | 0 | 100 | 0 | 100 | 0 | 100 | 0 | 100 |
| Reduction of Nitric Oxide | | | | | | | | | | |
| "Light-off" temp., °C. | 390 | — | 235 | 250 | 275 | 355 | 400 | — | 345 | — |
| 25% conversion, °C. | 440 | — | 275 | 295 | 350 | 395 | 460 | — | 415 | — |
| 50% conversion, °C. | 495 | — | 320 | 345 | 415 | 430 | 520 | — | 480 | — |
| 90% conversion, °C. | 580 | — | 390 | 420 | 485 | 490 | 605 | — | 585 | — |
| Oxidation of Carbon Monoxide | | | | | | | | | | |
| "Light-off" temp., °C. | 180 | — | 150 | 170 | 160 | 175 | — | — | 195 | — |
| 25% conversion, °C. | 200 | — | 160 | 180 | 170 | 190 | — | — | 285 | — |
| 50% conversion, °C. | 220 | — | 170 | 195 | 180 | 205 | — | — | 335 | — |
| 90% conversion, °C. | 245 | — | 185 | 215 | 200 | 230 | — | — | — | — |
| Oxidation of Propane | | | | | | | | | | |
| "Light-off" temp., °C. | 290 | — | 335 | 285 | 305 | 255 | — | — | 320 | — |
| 25% conversion, °C. | 350 | — | 455 | 380 | 420 | 310 | — | — | 515 | — |
| 50% conversion, °C. | 400 | — | 550 | 440 | 500 | 350 | — | — | — | — |
| 90% conversion, °C. | — | — | — | — | — | 560 | — | — | — | — |

TABLE III

| Example: | 11,21 | 12,22 | 13,23 | 14,24 | 15,25 | 16 | 26 | 17,27 | 19 | 18,28 | 20,29 |
|---|---|---|---|---|---|---|---|---|---|---|---|
| Percentage increase in weight | | | | | | | | | | | |
| Examples 11 to 25 | 21.2 | 24.9 | 26.2 | 26.5 | 26.2 | 22.3 | — | 28.1 | 25.2 | — | 26.9 |
| Examples 21 to 29 | 26.5 | 22.6 | 24.7 | 19.3 | 27.2 | — | 22.6 | 25.5 | — | 24.1 | 23.4 |
| Salts in solutions | \multicolumn{11}{c}{Grams per 100 Milliliters of Water} | | | | | | | | | | |
| Vanadium sulfate, $VOSO_4$ | 1.63 | — | — | — | — | — | — | — | — | — | — |
| Chromium nitrate, $Cr(NO_3)_3 \cdot 9H_2O$ | — | 4.00 | — | — | — | — | — | — | — | 4.00 | — |
| Iron nitrate, $Fe(NO_3)_3 \cdot 9H_2O$ | — | — | 4.04 | — | — | — | — | — | — | — | — |
| Cobalt nitrate, $Co(NO_3)_2 \cdot 6H_2O$ | — | — | — | 2.91 | — | — | — | — | — | — | — |
| Nickel nitrate, $Ni(NO_3)_2 \cdot 6H_2O$ | — | — | — | — | 2.91 | — | — | — | — | — | — |
| Copper nitrate, $Cu(NO_3)_2 \cdot 6H_2O$ | — | — | — | — | — | 2.41 | — | — | — | 1.48 | — |
| Copper nitrate, $Cu(NO_3)_2 \cdot 6H_2O$ | — | — | — | — | — | — | 2.96 | — | — | — | — |
| Zinc nitrate, $Zn(NO_3)_2 \cdot 6H_2O$ | — | — | — | — | — | — | — | 2.98 | — | — | — |
| Potassium chloroplatinate, $K_2PtCl_6 \cdot xH_2O$ (40% Pt) | — | — | — | — | — | — | — | — | 0.50 | — | — |
| Manganese acetate, $MnAc_2 \cdot 4H_2O$ | — | — | — | — | — | — | — | — | — | — | 2.45 |
| Metal content of impregnated cylinder, % | | | | | | | | | | | |
| Examples 11 to 20 | 0.11 | 0.10 | 0.11 | 0.14 | 0.13 | 0.15 | — | 0.15 | 0.08 | 0.19 | 0.12 |
| Examples 20 to 29 | 0.13 | 0.12 | 0.14 | 0.154 | 0.14 | — | 0.15 | 0.17 | — | 0.22 | 0.13 |

I claim:

1. A catalytic composition comprising a catalytically effective amount of at least one first metal oxide on a support of a second metal oxide, each of the first and second metal oxides having a perovskite crystal structure and the general formula, $ABO_3$, the first metal oxide having A site cations comprising at least one metal selected from Group 2A, lanthanum and the lanthanide rare earth metals, and having B site cations comprising at least one metal having an atomic number of 23 to 30, 42 to 47, or 74 to 79, the second metal oxide containing substantially equal numbers of metal cations in the A and the B sites, the A site cations being cations of at least one metal from Groups 1A, 1B, 2A, 3B, 4A, 5A, and the lanthanide rare earth metals, the B site cations being cations of at least one metal from Groups 1A, 1B, 2A, 2B, 3A, 3B, 4A, 4B, 5A, 5B, 6B, 7B, 8 and the lanthanide rare earth metals.

2. A catalytic composition of claim 1 wherein the first metal oxide contains at least one metal having an atomic number from 23 to 30 and at least one metal having an atomic number 42 to 47 or 74 to 79.

3. A catalytic composition of claim 2 wherein the first metal oxide contains at least about 1% of at least one metal selected from platinum and ruthenium.

4. A catalytic composition of claim 1 wherein the second metal oxide has a Lattice Stability Index of less than about 12.3 electron volts.

5. A catalytic composition of claim 1 wherein the first and second metal oxides contain at least one common metal.

6. A catalytic composition of claim 1 wherein the second metal oxide is calcium titanate.

7. A catalytic composition of claim 1 wherein the second metal oxide is lanthanum aluminate.

8. A process for the preparation of catalytic compositions comprising applying a catalytically effective amount of at least one first metal oxide on a support of a second metal oxide, each of the first and second metal oxides having a perovskite crystal structure and a general formula, $ABO_3$, the first metal oxide having A site cations comprising at least one metal selected from Group 2A, lanthanum and the lanthanide rare earth metals and having B site cations comprising at least one metal having an atomic number of 23 to 30, 42 to 47 or 74 to 79, the second metal oxide containing substantially equal numbers of metal cations in the A and the B sites, the A site cations being cations of at least one metal from Groups 1A, 1B, 2A, 3B, 4A, 5A and the lanthanide rare earth metals, the B site cations being cations of at least one metal from Groups 1A, 1B, 2A, 2B, 3A, 3B, 4A, 4B, 5A, 5B, 6B, 7B, 8 and the lanthanide rare earth metals.

9. A process of claim 8 comprising applying the first metal oxide to the second metal oxide by immersing the second metal oxide in a solution of precursors of the first metal oxide, removing the solvent, and heating the resulting coated second metal oxide for a time and at a temperature sufficient to convert the precursors to the first metal oxide.

10. A catalytic composition of claim 1 wherein the first metal oxide contains lanthanum.

11. A catalytic composition of claim 1 wherein the first metal oxide contains strontium.

12. A catalytic composition of claim 1 wherein the first metal oxide contains cobalt.

13. A catalytic composition of claim 1 wherein $[Sr_{0.2}La_{0.8}][Co]O_3$ is on the perovskite calcium titanate.

14. A catalytic composition of claim 1 wherein $[Sr_{0.4}La_{0.6}][Co_{0.9}Pt_{0.1}]O_3$ is on the perovskite $[Sr_{0.4}La_{0.6}][Co_{0.8}V_{0.2}]O_3$.

15. A catalytic composition of claim 1 wherein $[Sr_{0.2}La_{0.8}][Co_{0.9}Ru_{0.1}]O_3$ is on the perovskite lanthanum aluminate.

16. A catalytic composition of claim 1 wherein $[Sr_{0.4}La_{0.6}][Co_{0.9}Pt_{0.1}]O_3$ is on the perovskite $[Ba_{0.4}La_{0.6}][Co_{0.8}V_{0.2}]O_3$.

17. A catalytic composition of claim 1 wherein $[Sr_{0.2}La_{0.8}][Al_{0.9}Ru_{0.1}]O_3$ is on the perovskite lanthanum aluminate.

* * * * *